United States Patent [19]

Heusler et al.

[11] 3,964,596
[45] June 22, 1976

[54] CONVEYOR, ESPECIALLY AUTOWALKS FOR PERSONS

[75] Inventors: Helmut Heusler, Dortmund-Kirchhorde; Emil Braun, Castrop-Rauxel; Peter Höfling, Dortmund, all of Germany

[73] Assignee: O & K Orenstein & Koppel Aktiengesellschaft, Berlin, Germany

[22] Filed: Jan. 24, 1975

[21] Appl. No.: 543,827

[30] Foreign Application Priority Data
Jan. 25, 1974  Germany............................ 2403529

[52] U.S. Cl. ........................... 198/16 MS; 198/181
[51] Int. Cl.² ........................................ B61B 13/14
[58] Field of Search .............. 198/16 MS, 181, 182, 198/189, 195

[56] References Cited
UNITED STATES PATENTS
2,844,241   7/1958   King................................. 198/189 X
3,265,193   8/1966   Bessant............................. 198/182

Primary Examiner—Evon C. Blunk
Assistant Examiner—Douglas D. Watts
Attorney, Agent, or Firm—Walter Becker

[57] ABSTRACT

Conveyor, especially autowalks for persons, with endless inner and outer link chains and pallet carriages arranged between these chains and having opposite ends respectively connected to these chains. Both chains are driven in synchronism either by two coaxial gears or by a reversing gear pertaining to the inner chain and deviating gears pertaining to the outer chain and intermediate gear means between the reversing gear for the inner chain and one of the deviating gears for the outer chain.

10 Claims, 7 Drawing Figures

CONVEYOR, ESPECIALLY AUTOWALKS FOR PERSONS

The present invention relates to a conveyor, especially autowalk for persons, which includes a link belt movable by pulling means in the same conveying plane over reversing stations in a countercurrent direction and with pallet carriages (Palettenwagen) movable on endless guiding paths.

With the heretofore known autowalk or roller foot path for conveying persons, the forward moving and returning section is used for conveying persons. With this type of roller path, a unilaterally arranged pulling means is utilized to which the pallets movable on rollers and serving as conveyor means have their outer edge linked to the pulling means. As a result thereof, due to the unilateral linking of the pallet carriages to the pulling means the forces will become the greater the greater according to the distance is of the load on the pallet carriage, depending on the distance of the place the person is standing on said pallets from the linkage points at the pulling means. Such an arrangement not only requires a special connection between the chain and the pallet carriage, but also brings about a labile guiding of the entire endless conveyor belt so that a high wear is unavoidable.

According to another heretofore known arrangement, attempts have been made to overcome the above mentioned drawbacks by providing a central chain along the longitudinal central lane of the conveyor. However, also in this instance, a proper guiding of the pallet carriage is not possible in view of the non-uniform load exerted upon the pallets. These difficulties increase even after some period of running of the conveyor, due to the wear of the chain.

It is, therefore, an object of the present invention to obviate the drawbacks of heretofore known arrangements of roller foot paths or escalators with a reversal of the two counter running conveyor sections in which the reversal is effected in one plane and in which the points of attack of the forces are distributed uniformly over both sides of the conveyor section so that a proper guiding will be created without sacrificing the advantage of a low construction by which feature the arrangement according to the invention advantageously distinguishes over heretofore customary roller foot paths, or the like, with which the reversal is effected by means of horizontally arranged axles.

These and other objects and advantages of the invention will appear more clearly from the following specification, in connection with the accompanying drawings, in which:

FIG. 5a is a fragmentary elevational view representing modification of structure of FIG. 5 turned around 90°.

Figure 1:
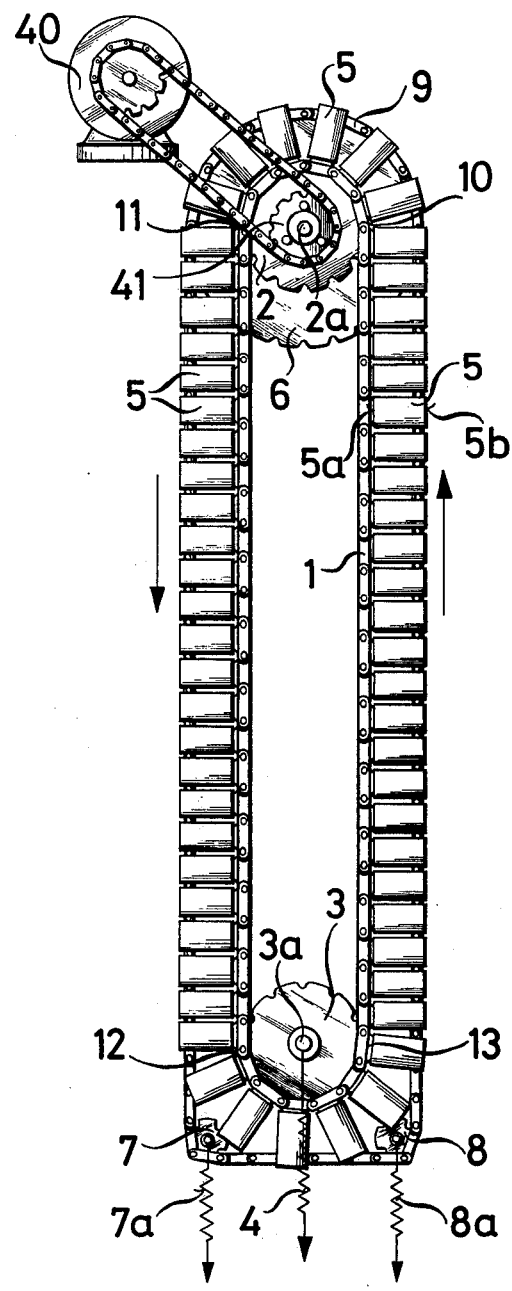
FIG. 1 is a diagrammatic top view of a roller path according to the invention.
Figure 2:
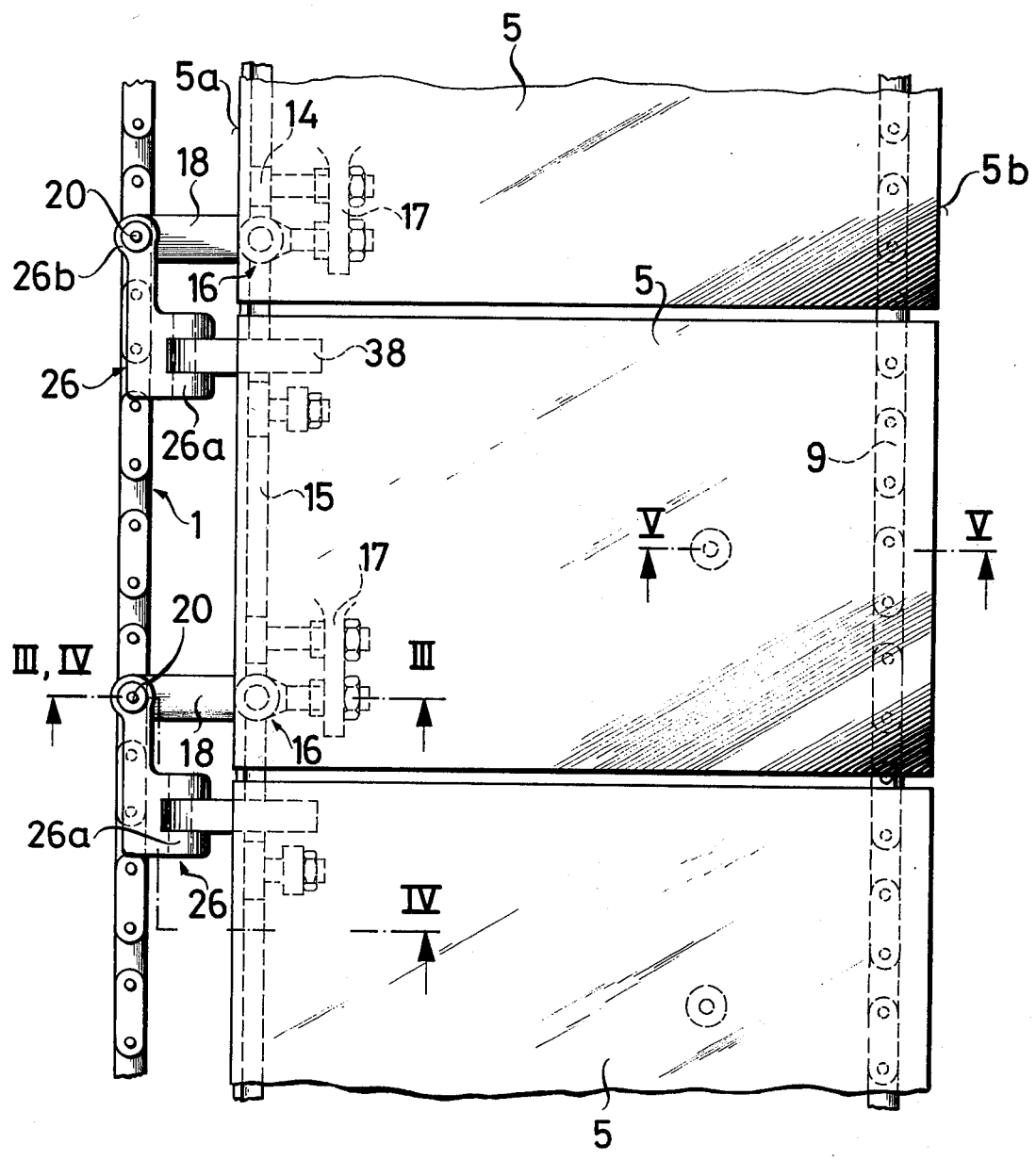
FIG. 2 is a top view of the structural design of the roller path according to FIG. 1, but on a larger scale than that of FIG. 1.
Figure 3:
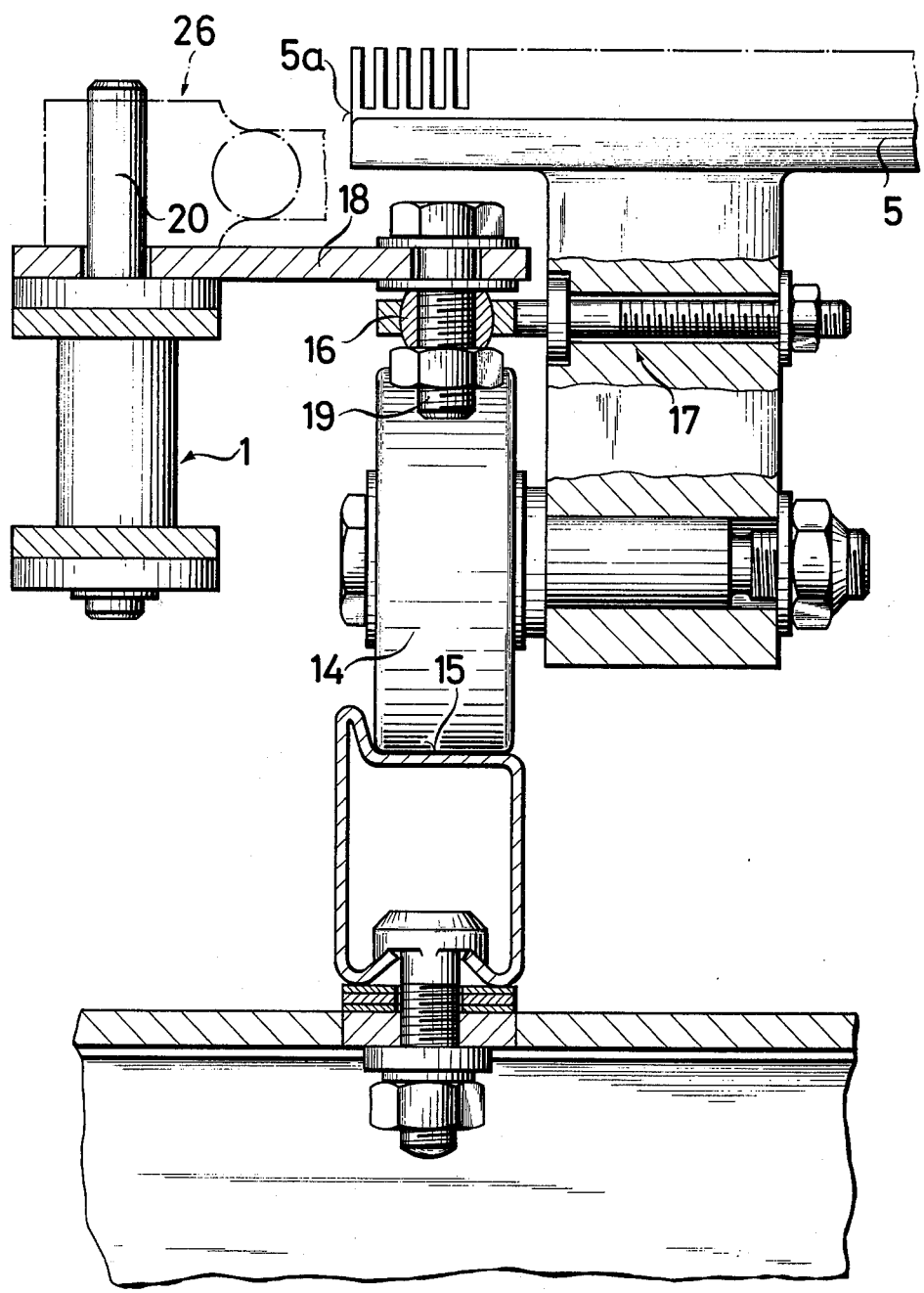
FIG. 3 is a section through the positive connection between the pallet carriage and the inner chain on an enlarged scale, said section being taken along the line III—III of FIG. 2.
Figure 4:
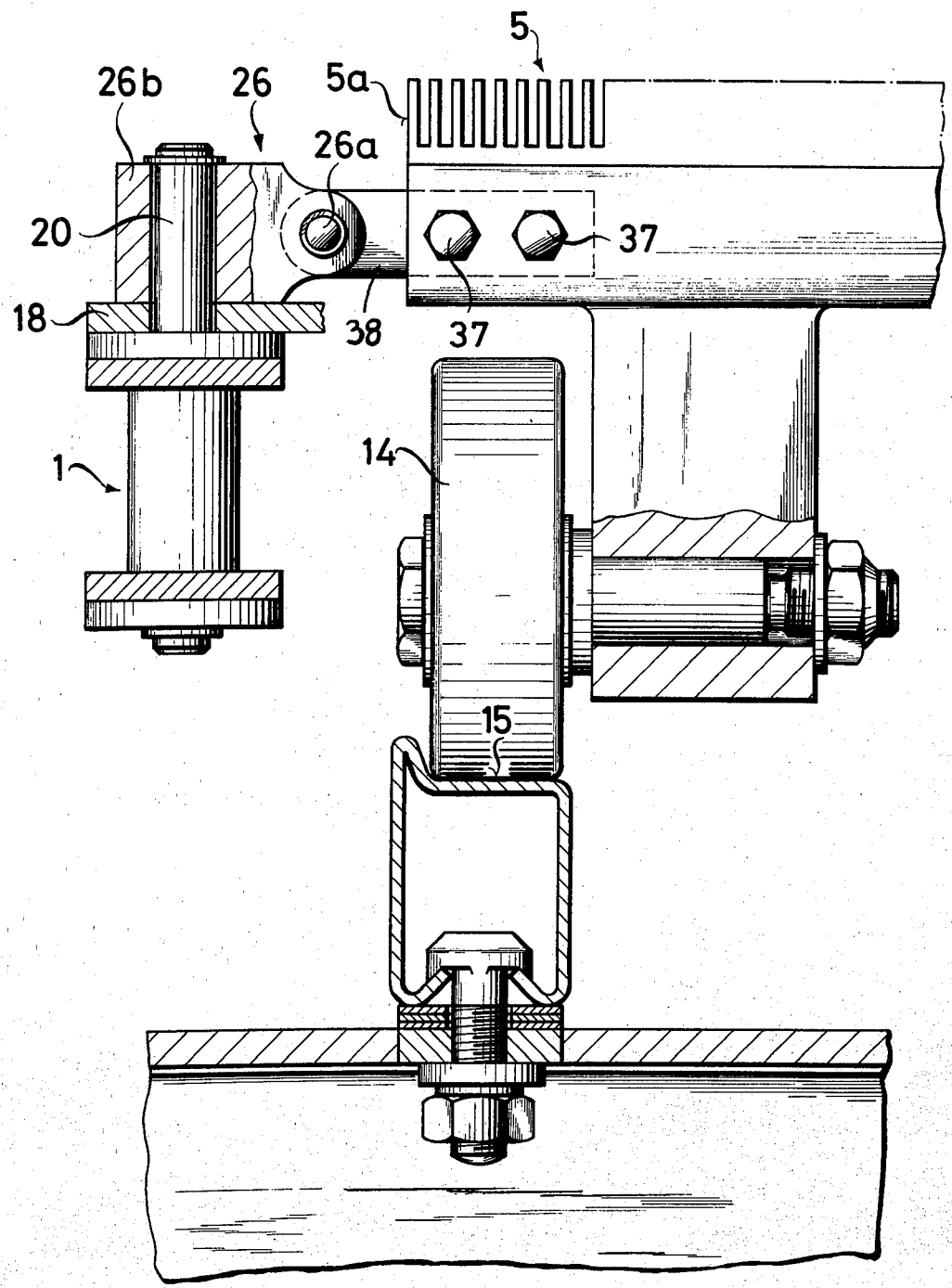
FIG. 4 is a section through the positive connection between the pallet carriage and the inner chain, said section being taken along the ine IV—IV of FIG. 2.

The conveyor according to the present invention is characterized primarily in that the pallet carriages are respectively connected by two pulling means at both longitudinal edges. According to a practical embodiment of the invention, the pulling means by way of two driving wheels are coaxially arranged with regard to each other and a reducing transmission driven in such a way that the speed of the driving wheels is at an inverse ratio to the diameter of the driving wheels.

According to a further development of the invention, the pallet carriages are at their inner edges positively connected to one of the pulling means and at their outer edges are frictionally connected to the other pulling means.

Referring now to the drawings in detail, at a distance corresponding to the conveying distance of the roller path, the two reversing gears 2 and 3 for driving and guiding the inner pulling means 1, for instance, a chain, are journaled on vertically arranged axles 2a and 3a. The reversing gear 3 is equipped with the chain tensioning device 4. The pallet carriages at their inner edges 5a are positively connected to the pulling means 1. The reversing gear 6 together with the reversing gears 7 and 8 guide the chain 9. The distance between the reversing gears 7 and 8 corresponds to the diameter of the reversing gear 6. The chain 9 is tensioned by means of the chain tensioning device 7a and 8a. The pallet carriages 5 at their outer edge 5b are frictionally connected to the chain 9. However, this connection may also be positive. Since the pulling means 1 and 9 have the same speed, a reducing transmission 41 is arranged between the driving motor 40 and the pertaining driving gears 2 and 6. By means of this reducing transmission 41, the different speeds of the two driving gears 2 and 6 are produced. The diameters of gears 2 and 6 have a ratio which is inverse to their speeds.

There will now be explained how the frictional and positive connection is designed and how the connection between the outer pulling means 9 and the pallet carriages 5 at the reversing points 10, 11, 12 and 13, is disengaged and is again re-established.

Figure 5:
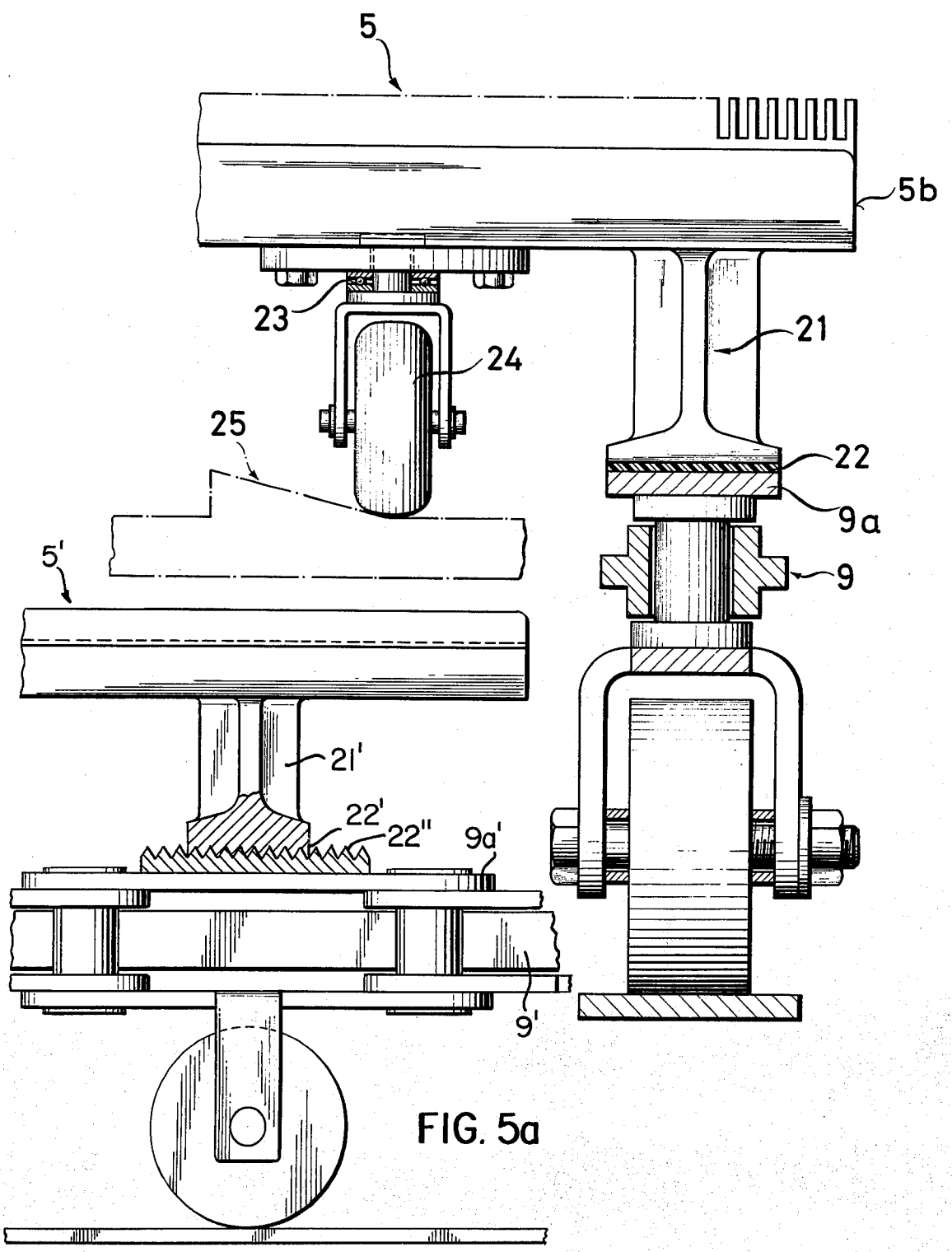
FIG. 5 represents a section through the frictional connection between the pallet carriage and the outer chain on an enlarged scale, said section being taken along the line V—V of FIG. 2.

Beyond the reversing point 10, the connection between the outer chain 9 and the outer edge 5b of the pallet carriage 5 passes over a different distance on the outer circumference of the reversing gear 6 than does the inner edge relative to the reversing gear 2. The same remarks apply to the reversing point 12. At the reversing point 11 the frictional connection is again re-established. The same applies to the reversing point 13. In order to make it possible that the pallet carriages 5 which are guided on the guiding path 15 by rollers 14 can pivot about the short radius of the smaller reversing gear 2, their connection with the chain 1 is effected through the intervention of two pivot joints, namely, the hinge joint 26 and the ball joint 16. The ball joint 16 is connected to the holding means 17 near the inner edge 5a of the pallet carriage 5. The plate 18 is connected to the ball joint 16 by screw 19. The free end of the plate 18 is, in turn, rotatably placed upon the follower bolt 20 of chain 1. The hinge joint 26 is likewise connected to the holding means 38 near the outer edge 5a of the pallet carriage 5 by means of screws 37 and by means of a sleeve 26b the same is rotatably placed upon the follower bolt 20 of chain 1. In order to prevent different extensions of the pulling means during the operation of the conveyor from causing angular positions of the pallet carriage 5, a frictional connection between the pallet carriage 5 and the outer pulling means 9 is provided (FIG. 5). The pallet carriages below the outer edge 5b are provided with a support 21. The bottom side of the support 21 is provided with a plate 22 of an elastic material, as for instance, synthetic material or rubber. Due to their own weight and in view of the load acting upon the pallet carriages 5, the support 21 rests with the elastic plate 22 on the plates 9a of the chain 9 and due to frictional engagement form a frictional connection. This frictional connection is the more intensive the more the pallet carriages 5 are loaded by persons being transported. On the other hand, the frictional connection at the end of the straight conveying path at the reversing points 10 and 12 is eliminated, due to the fact that at the bottom side of the pallet carriage 5, rollers 24 rotatable by means of a ball bearing 23 roll onto a conical surface 25 which is arranged shortly ahead of the reversing points 10 and 12. Due to this arrangment it will be brought about that the pallet carriages 5 are lifted about the pivot 26a of the hinge joint 26 so that the frictional connection between the pallet carriages 5 and the chain 9 is disengaged. The hinge joint 26 by way of holding means 38 being connected to the pallet carriage 5 by screws 37 is connected to the pallet carriage 5 and is rotatably mounted on bolt 20 through the intervention of a sleeve 26b of the hinge joint 26. The pallet carriages are again frictionally coupled to the chain 9 when the reversal has been finished, which means when the chain again reaches the straight path.

The console or support 21' can also be provided with a tooth means 22' along the underside thereof rather than with synthetic material. By way of gravity and as a consequence of loading of the pallet carriage 5' there is noted that the consoles or supports with the tooth means 22'' engage upon a correspondingly toothed piece which engages upon plates 9a' of the chain 9' and thereby forming a positive connection. At the end of the straight conveying stretch, this positive connection becomes dissolved at the reversing points 10 and 12 as described previously with the positive connection. The pallet carriage means become positively coupled again to the chain 9' when the diverting or reversing is terminated.

Figure 6:
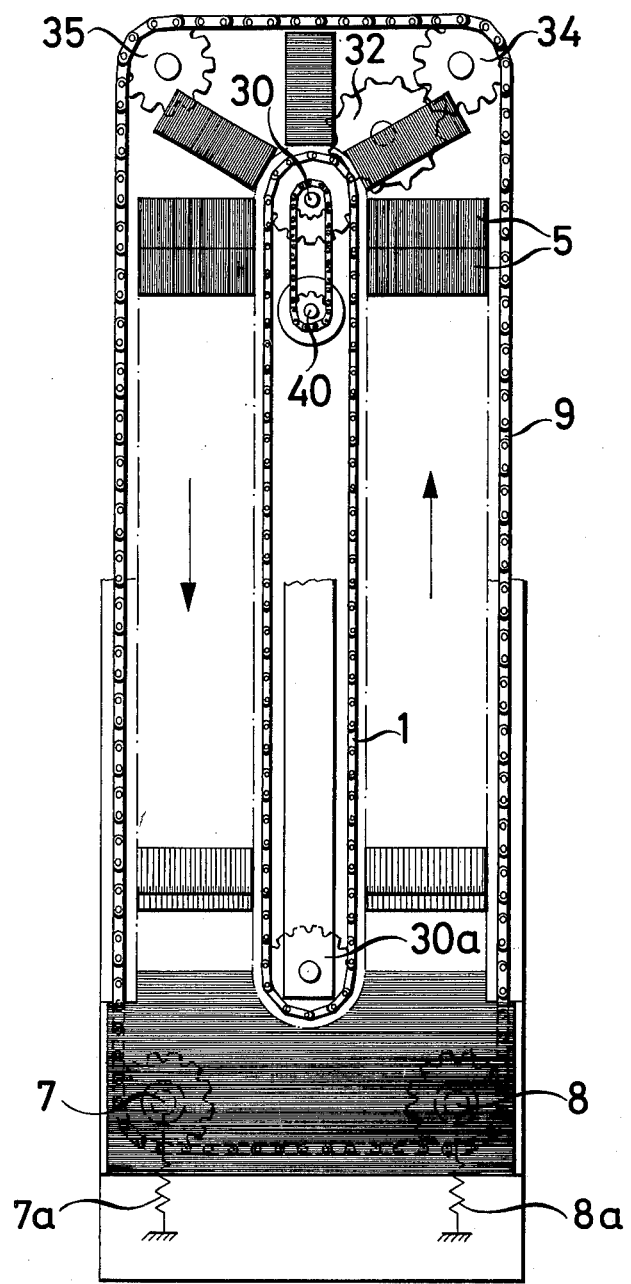
FIG. 6 is a diagrammatic top view of another embodiment of a roller path according to the invention.

According to another embodiment of the arrangement of the invention as illustrated in FIG. 6, the drive is not effected as in the embodiment referred to above by means of two reversing gears coaxially arranged on an axle, but is effected from the little driven reversing gear 30; 34 or 35, which is arranged along the longitudinal central line and together with the reversing gear 30a serves for guiding the inner chain. More specifically, the drive is effected via a gear 32 or another suitable driving means, such as a chain, to the reversing gears 34 and 35 for guiding and reversing the outer chain 9. At the other end of the conveyor, the chain 9 is passed over reversing gears 7 and 8 as described above which are provided with tensioning devices 7a and 8a. This arrangement has the advantage that the distance between the vertical axes of the reversing gears 7 and 8 and between the reversing gears 34 and 35 can be selected as desired so that depending on the prevailing local structural requirements, the forward and rearward moving sections of the foot path can be arranged separately from each other. The diameters of the reversing gears 30, 30a, 34, 35, 7, and 8 are equal. The reversing gear 30 is driven by a motor 40. Thus, the chain strands 1 and 9 have the same speed.

Depending on the conveying length, additionally a drive may be effected via the vertical axis of the reversing gear 35. In such an instance, a connection will likewise be necessary between the reversing gears 30 and 35 by means of a gear or a chain.

It is, of course, to be understood that the present invention is, by no means, limited to the specific showing in the drawing, but also comprises any modifications within the scope of the appended claims.

What we claim is:

1. A conveyor, especially roller foot path, for conveying persons, which includes: a first endless link chain movable in one and the same plane and with one section of said link chain movable in one direction and the other section of said link chain simultaneously movable in the opposite direction, a second endless link chain movable in one and the same plane and with one section of said link chain movable in a first direction and the other section of said link chain simultaneously movable in the opposite direction to said first direction, driving means drivingly connected to said first and second link chains for driving the same in the same direction and in synchronism with each other, and a plurality of pallet carriages having opposite end portions respectively connected to said first and second link chains, said first link chain forming the inner chain while said second link chain forms the outer chain, and ball joints and hinge joints being interposed between said first chain and the respective adjacent end portions of said pallet carriages, said last mentioned end portions of said pallet carriages being connected to said first chain by said ball joints and said hinge joints.

2. A conveyor according to claim 1, in which said driving means include two coaxially arranged driving gears and also reducing transmission means, said driving gears respectively being rotatable at a speed ratio inverse to the diameters of said driving gears.

3. A conveyor according to claim 1, which includes a pair of reversing gears having said first link chain looped therearound, and two pairs of deviating gears having said second link chain looped therearound, said two pairs of deviating gears being arranged laterally spaced from and symmetrically with regard to the plane of symmetry passing through and in axial direction of the axes of rotation of the reversing gears of said pair of reversing gears, the deviating gears of said two pairs of deviating gears also being located outwardly of said first link chain and spaced in the longitudinal direction of said plane of symmetry from said first chain link so that said second link chain passing over said two pairs of deviating gears substantially describes a rectangle, and intermediate gear means drivingly interconnecting one of said reversing gears with one of said deviating gears.

4. A conveyor according to claim 1, in which one end portion of said pallet carriages is positively connected to said first endless link chain, and in which the other end portion of said pallet carriages is frictionally connected to said second endless link chain.

5. A conveyor according to claim 1, in which said opposite end portions of said pallet carriages are positively connected to said link chains over those portions thereof which are located between said reversing gears of said first link chain and between those deviating gears which are spaced from each other by approximately the long sides of said rectangle.

6. A conveyor according to claim 1, in which one of said link chains is located in a plane higher than the plane of the other chain.

7. A conveyor according to claim 1, which includes supporting means provided at the bottom side of that end portion of said pallet carriages which is adjacent said second link chain, said last mentioned supporting means having a free end provided with teeth means, and tooth-shaped depression means arranged above said second chain and supporting said free end of said supporting means.

8. A conveyor according to claim 1, which includes supporting means provided at the bottom side of that end portion of said pallet carriages which is adjacent said second link chain, roller means mounted near said last mentioned supporting means for pivoting about a vertical axis, and inclined surface means arranged where said chains change their direction and adapted to be passed over by said roller means when the respective pallet carriages approach that area of the conveyor path where said chains change their direction.

9. A conveyor according to claim 8, which includes plate means of elastic material arranged on the bottom side of said supporting means, said supporting means resting on said second link chain through the intervention of said plate means.

10. A conveyor, especially roller foot path, for conveying persons, which includes: a first endless link chain movable in one and the same plane and with one section of said link chain movable in one direction and the other section of said link chain simultaneously movable in the opposite direction, a second endless link chain movable in one and the same plane and with one section of said link chain movable in a first direction and the other section of said link chain simultaneously movable in the opposite direction to said first direction, driving means drivingly connected to said first and second link chains for driving the same in the same direction and in synchronism with each other, and a plurality of pallet carriages having opposite end portions respectively connected to said first and second link chains, one end of said pallet carriages being connected to said first chain by hinge means and by ball joints and bolts, said ball joints and bolts being spaced from said hinge means in the direction of movement of said first chain, and the other end of said pallet carriages having the bottom side thereof equipped with supporting means provided with adhesive elastic material resting on said second chain.

* * * * *